United States Patent [19]

Nakamura

[11] 4,431,273
[45] Feb. 14, 1984

[54] INVERTED TELEPHOTO TYPE WIDE ANGLE LENS SYSTEM

[75] Inventor: Akiyoshi Nakamura, Sakai, Japan

[73] Assignee: Minolta Camera Kabushiki Kaisha, Machi, Japan

[21] Appl. No.: 189,212

[22] Filed: Sep. 22, 1980

[30] Foreign Application Priority Data

Oct. 3, 1979 [JP] Japan .................. 54-128156

[51] Int. Cl.³ .................. G02B 13/04; G02B 13/18
[52] U.S. Cl. ........................... 350/432; 350/458
[58] Field of Search .................. 350/458–461, 350/432

[56] References Cited

U.S. PATENT DOCUMENTS

| | | | |
|---|---|---|---|
| 3,832,035 | 8/1974 | Takahashi | 350/189 |
| 3,856,386 | 12/1974 | Fujioka | 350/214 |
| 3,877,795 | 4/1975 | Yamashita | 350/214 |
| 3,884,556 | 5/1975 | Nakagawa | 350/214 |
| 3,981,563 | 9/1976 | Nakamura | 350/214 |
| 4,013,350 | 3/1977 | Ogawa | 350/458 |
| 4,029,397 | 6/1977 | Yamashita | 350/458 |
| 4,150,872 | 4/1979 | Sugiyama | 350/458 |
| 4,310,222 | 1/1982 | Ikamori | 350/458 X |
| 4,348,085 | 9/1982 | Mogami | 350/458 |

FOREIGN PATENT DOCUMENTS 52-66422 6/1977 Japan .
53-55119 5/1978 Japan .

*Primary Examiner*—John K. Corbin
*Assistant Examiner*—Scott J. Sugarman
*Attorney, Agent, or Firm*—Jackson, Jones & Price

[57] ABSTRACT

The present invention is directed to an inverted telephoto type wide angle lens system having a field angle of 114 degrees and an aperture ratio of 1/2.8. The lens system comprises eleven lens groups and fourteen lens elements which fulfill the following conditons:

$$1.0\,f < |f_F| < 1.4\,f$$

$$4.5\,f < R_1 6.4\,f$$

$$1.2\,f < R_2 < 1.7\,f$$

$$1.2\,f < R_3 < 1.5\,f$$

wherein:
 f represents the focal length of the whole lens system;
 $f_F$ represents the focal length of the front lens group;
 $R_1$ represents the radius of curvature of the image side surface of the front positive meniscus lens in the front lens group;
 $R_2$ represents the radius of curvature of the image side surface of the first negative meniscus lens in the front lens group; and
 $R_3$ represents the radius of curvature of the second negative meniscus lens in the front lens group.

15 Claims, 16 Drawing Figures

——— Spherical Aberration
---- Sine Condition

FIG.4b

Astigmatism

FIG.4c

Distortion

— Spherical Aberration
---- Sine Condition

FIG.6b

Astigmatism

FIG.6c

Distortion

—— Spherical Aberration
---- Sine Condition

FIG.8b

Astigmatism

FIG.8c

Distortion

INVERTED TELEPHOTO TYPE WIDE ANGLE LENS SYSTEM

BACKGROUND OF THE INVENTION

1. Field of the Invention

The present invention relates to an inverted telephoto type wide angle lens system having a relatively high aperture ratio of about 1/2.8 with a wide field angle of greater than 100 degrees.

2. Description of Prior Art

Attempts to increase the field of view of camera objectives while still providing images with relatively low distortion are well known. Experiences in the prior art with extra wide angle objectives of an inverted telephoto type have disclosed that negative distortion frequently increases as the photographing angle increases. This negative distortion further increases with an increase in the back focal length and in the aperture ratio, with the result that the aperture of the front lens tends to be undesirably enlarged.

The prior art has attempted to utilize a front lens group of a negative refractive power for attaining the necessary back focal distance to permit the movement of the reflex mirror. The reflex mirror is generally mounted to be swingably moved in an upward direction when an exposure is to be made in a single lens reflex camera. The use of a negative front lens group, however, generates considerable negative distortion and astigmatism and the correction of these aberrations are particularly difficult when a lens system is desired to have a greater field angle and a greater aperture ratio than the commercial wide angle lens systems usually available.

Various inverted telephoto type wide angle lens systems have been suggested in the prior art such as those disclosed in U.S. Pat. Nos. 3,832,035, 3,856,386, 3,877,795, 3,884,556, and 3,981,563. Additionally, Japanese Patent Application Laid Open Nos. 52-66422 and 53-55119 are cited of general interest.

The consumer requirements of the camera industry have placed increasing demands on lens designers to provide ever increasing optical performances while further compacting and making lightweight lens systems. Accordingly, even though the prior art is crowded in attempts to achieve improved optical performance, there is still a demand to provide an improved inverted telephoto type wide angle lens system.

SUMMARY OF THE INVENTION

It is an object of the present invention to provide a wide angle lens system having well corrected aberrations, while providing a greater aperture ratio and a wider field angle than the conventional ones available.

Another object of the present invention is to provide an inverted telephoto type wide angle lens system which is capable of being used as an objective of a single lens reflex camera and having an aperture ratio of 1/2.8, a field angle of 114 degrees, and a back focal distance greater than 2.5 times the focal length of the whole lens system.

The present invention is directed to an inverted telephoto type wide angle lens system having eleven lens groups. The first four lens groups comprise a front lens group of an overall negative refractive power and include first to fourth meniscus lenses each convex to the object side, the first being positive and the second to the fourth being negative. At least one of the refractive surfaces in the front lens group is aspheric. The lens system further includes a rear lens group of an overall positive refractive power comprising first to seventh lenses, the second and the fifth being negative while others being positive. The lens system further fulfills the following conditions:

$$1.0f < |f_F| < 1.4f$$

$$4.5f < R_1 < 6.4f$$

$$1.2f < R_2 < 1.7f$$

$$1.2f < R_3 < 1.5f$$

wherein:
 f represents the focal length of the whole lens system;
 $f_F$ represents the focal length of the front lens group;
 $R_1$ represents the radius of curvature of the image side surface of the first positive meniscus lens in the front lens group;
 $R_2$ represents the radius of curvature of the image side surface of the second negative meniscus lens in the front lens group; and
 $R_3$ represents the radius of curvature of the third negative meniscus lens in the front lens group.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DETAILED DESCRIPTION OF THE PREFERRED EMBODIMENTS

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a compact inverted telephoto type wide angle lens system of an extremely wide angle.

The derivation of the specific parameters of the lens embodiments disclosed herein can be accomplished with the assistance of a computer. The present invention represents the parameters of a compromised balance of acceptable aberrations in a relatively easily manufactured lens assembly that is particularly suited for a single lens reflex camera. The data presented herein in the tables, to be discussed subsequently, are more than adequate to permit a competent artisan in the optical art to reproduce the embodiments of the present invention. In the accompanying drawings, which supplement the following tables, the lenses in accordance with the present invention are illustrated schematically. As usual, in conventional lens diagrams, the light is assumed to travel from left to right and the individual lens groups are designated by the letter, L, with a subscript indicating the position of the lenses as numbered consecutively from the object to image side. Due to the large number of lens elements involved, the drawings have omitted the symbols for the radii of curvature and axial distances. The tables, however, more than adequately provide this information.

In the tables, the minus (−) signs indicate surfaces concave toward the object side, while the surfaces without a sign are convex toward the object side. The radius of curvature is disclosed and is indicated by the letter, r, with a subscript corresponding to the consecutive surfaces of the lens elements from left to right. The axial spacings are designated with the letter, d, again with the subscript indicating the distance consecutively from the left to the right. The axial spacings will include both the thickness of the lens and the air spaces, and in this regard, the value of the axial spacings between the lens elements are appropriately positioned in the tables relative to the values of the radius of curvature to indicate whether the axial distance is an air space or a thickness of the lens. The tables also provide, with respect to each embodiment, the field angle $2\omega$, the f number, and the focal length. The refractive index is designated as Nd, while the Abbe number is $\nu d$.

The term "lens" in this specification means both a single lens element and cemented lens composed of a plurality of single lens elements. For example, any one of the lenses in the front lens group may be a doublet, and, in this case, it would be preferable that at least one of the elements in the doublet was a plastic lens element such as a methylmethacrylate lens element, since the plastic lens can be conveniently molded with an aspheric surface. Additionally, because of the favorable molding of a plastic lens, the lens element having an aspheric surface of the present invention may also be a single lens element made from plastic.

Referring to the specific embodiments of the present invention disclosed in FIGS. 1, 3, 5, and 7, the present invention provides an inverted telephoto type wide angle lens system comprising from the object to the image side, a front lens group ($L_1$ to $L_4$) of an overall negative refractive power having a front or positive meniscus lens ($L_1$) convex to the object side and second to fourth negative meniscus lenses ($L_2$ to $L_4$) each convex to the object side, at least one of the refractive surfaces in the front lens group being aspheric; and a rear lens group ($L_5$ to $L_{11}$) of an overall positive refractive power having a pair of positive lenses ($L_5$ and $L_7$) sandwiching a negative meniscus lens ($L_6$) convex to the object side, an aperture stop, and a fourth to seventh lenses ($L_8$ to $L_{11}$). The lens system according to the present invention further fulfills the following conditions:

$$1.0f < |f_F| < 1.4f$$

$$4.5f < R_1 < 6.4f$$

$$1.2f < R_2 < 1.7f$$
$$1.2f < R_3 < 1.5f$$

wherein, f represents the focal length of the whole lens system; $f_F$ represents the focal length of the front lens group; $R_1$ represents the radius of curvature of the image side surface of the front positive meniscus lens in the front lens group; $R_2$ represents the radius of curvature of the image side surface of the second negative meniscus lens in the front lens group; and $R_3$ represents the radius of curvature of the image side surface of the third negative meniscus lens in the front lens group.

As is understood from the above description, the lens construction from $L_1$ to $L_{11}$, the front lens group having a positive front lens and at least one aspheric refractive surface, and the four conditions, are representative of the features of the present invention.

An aspheric surface is utilized to correct aberrations, which would otherwise be difficult to correct with a conventional surface for the desired field angle. Such a design is favorable in that the height, which is measured from the optical axis of the principal ray of an off axial pencil, will enter the aspheric surface with a maximum angle to the optical axis. In other words, it is desirable that the aspheric surface be designed to have a greater influence on the off axial aberrations than on the axial aberrations for balancing the aberration correction all over the entire image area. Thus, one of the refractive surfaces in the front lens group is designed to be aspheric in the present invention, more preferably the object side surface of one of the lenses in the front lens group being aspheric. Such an object side aspheric surface is so shaped that the aspheric surface increases its height from the optical axis. Namely, the greater the angle of incidence of a light pencil, the greater the positive refractive effect of the aspheric surface on the light pencil, which thereby corrects the negative distortion.

With respect to the conditions of the present invention, condition (1) is for defining the negative refractive power of the front lens group. If the lower limit of this condition is violated, then negative distortion would be greatly increased by the excessive negative refractive power of the front lens group. Additionally, astigmatism, which cannot be adequately corrected by the rear lens group, would result from the correction of the negative distortion by means of an aspheric surface. On the contrary, the necessary back focal distance cannot be obtained if the upper limit of condition (1) is violated since the front lens group will have an insufficient negative refractive power.

Conditions (2) to (4) each define the radius of curvature of the image side surface of the lenses $L_1$, $L_2$ and $L_3$, respectively. If the lower limit is violated in any of these conditions, then large amounts of the negative distortion and astigmatism are generated and cannot be sufficiently corrected, even by the use of an aspheric surface. However, a short back focal distance would undesirably result from the violation of any one of the upper limits of the conditions (2) to (4), since the negative refractive power of the front group would be insufficient. Further, in this case, it would be difficult to correct astigmatism, and an insufficient illumination of the peripheral area of the image would be caused.

As shown in the drawings, the lens system according to the present invention may also include a filter. The filter can be removably mounted for insertion into and out of the optical axis.

The following Tables 1 to 4 represent, respectively, embodiments 1 to 4 of the present invention. The stars (*) in the tables indicates an aspheric surface. For example, the object side surface ($r_1$) of the front positive meniscus lens ($L_1$) is the aspheric surface in case of embodiment 1. The aspheric surface is expressed as follows:

$$X = \frac{C_0 Y^2}{1 + (1 - C_0^2 Y^2)^{\frac{1}{2}}} + \sum_{i=1} C_i Y^{2i}$$

wherein: X represents the coordinate along the optical axis measured from the top of the basis spherical surface; Y represents the coordinate perpendicular to the optical axis measured from the optical axis (height from the optical axis); $C_0$ represents the curvature of the basis spherical surface; and $C_i$ represents the aspheric surface coefficient. Table 5 summarizes the values for determining the aspheric surface with respect to each embodiment.

TABLE 1

(Embodiment 1)

f = 14.35, $F_{No}$ = 2.8, $2\omega$ = 114°

| | | Radius of Curvature | Axial Distance | Refractive Index | Abbe Number |
|---|---|---|---|---|---|
| $L_1$ | $r_1$* | 69.55 | $d_1$ 10.00 | $Nd_1$ 1.6031 | $vd_1$ 60.7 |
| | $r_2$ | 72.50 | $d_2$ 0.15 | | |
| $L_2$ | $r_3$ | 37.93 | $d_3$ 3.10 | $Nd_2$ 1.6968 | $vd_2$ 55.5 |
| | $r_4$ | 19.76 | $d_4$ 11.61 | | |
| $L_3$ | $r_5$ | 34.65 | $d_5$ 1.70 | $Nd_3$ 1.6968 | $vd_3$ 55.5 |
| | $r_6$ | 18.98 | $d_6$ 5.63 | | |
| $L_4$ | $r_7$ | 36.67 | $d_7$ 1.30 | $Nd_4$ 1.7725 | $vd_4$ 49.8 |
| | $r_8$ | 18.39 | $d_8$ 5.98 | | |
| | $r_9$ | ∞ (filter) | $d_9$ 1.80 | $Nd_5$ 1.5163 | $vd_5$ 64.1 |
| | $r_{10}$ | ∞ | $d_{10}$ 0.80 | | |
| $L_5$ | $r_{11}$ | −605.88 | $d_{11}$ 1.50 | $Nd_6$ 1.6968 | $vd_6$ 55.5 |
| | $r_{12}$ | 14.82 | $d_{12}$ 7.42 | $Nd_7$ 1.6034 | $vd_7$ 38.0 |
| | $r_{13}$ | −42.70 | $d_{13}$ 0.50 | | |
| $L_6$ | $r_{14}$ | 25.40 | $d_{14}$ 0.90 | $Nd_8$ 1.7725 | $vd_8$ 49.8 |
| | $r_{15}$ | 13.65 | $d_{15}$ 1.14 | | |
| $L_7$ | $r_{16}$ | 16.78 | $d_{16}$ 6.00 | $Nd_9$ 1.5112 | $vd_9$ 51.0 |
| | $r_{17}$ | −2302.13 | $d_{17}$ 2.50 | | |
| $L_8$ | $r_{18}$ | 1037.13 | $d_{18}$ 5.40 | $Nd_{10}$ 1.5112 | $vd_{10}$ 51.0 |
| | $r_{19}$ | −44.79 | $d_{19}$ 0.20 | | |
| $L_9$ | $r_{20}$ | 140.52 | $d_{20}$ 5.40 | $Nd_{11}$ 1.6990 | $vd_{11}$ 31.1 |
| | $r_{21}$ | −18.65 | $d_{21}$ 2.15 | $Nd_{12}$ 1.5955 | $vd_{12}$ 39.2 |
| | $r_{22}$ | 51.92 | $d_{22}$ 1.00 | | |
| $L_{10}$ | $r_{23}$ | −168.60 | $d_{23}$ 0.80 | $Nd_{13}$ 1.9229 | $vd_{13}$ 20.9 |
| | $r_{24}$ | 28.89 | $d_{24}$ 5.10 | $Nd_{14}$ 1.4875 | $vd_{14}$ 70.1 |
| | $r_{25}$ | −18.84 | $d_{25}$ 0.15 | | |

TABLE 1-continued (Embodiment 1)

f = 14.35, $F_{No}$ = 2.8, $2\omega$ = 114°

| | | Radius of Curvature | Axial Distance | Refractive Index | Abbe Number |
|---|---|---|---|---|---|
| $L_{11}$ | $r_{26}$ | −528.51 | $d_{26}$ 2.75 | $Nd_{15}$ 1.7725 | $vd_{15}$ 49.8 |
| | $r_{27}$ | −35.09 | | | |

TABLE 2

(Embodiment 2)

f = 14.35, $F_{No}$ = 2.8, $2\omega$ = 114°

| | | Radius of Curvature | Axial Distance | Refractive Index | Abbe Number |
|---|---|---|---|---|---|
| $L_1$ | $r_1$ | 54.44 | $d_1$ 10.00 | $Nd_1$ 1.6031 | $vd_1$ 60.7 |
| | $r_2$ | 74.70 | $d_2$ 0.15 | | |
| $L_2$ | $r_3$* | 69.06 | $d_3$ 1.00 | $Nd_2$ 1.4901 | $vd_2$ 57.9 |
| | $r_4$ | 46.51 | $d_4$ 2.10 | $Nd_3$ 1.6935 | $vd_3$ 53.4 |
| | $r_5$ | 23.65 | $d_5$ 9.70 | | |
| $L_3$ | $r_6$ | 35.73 | $d_6$ 1.70 | $Nd_4$ 1.6975 | $vd_4$ 48.3 |
| | $r_7$ | 20.19 | $d_7$ 6.50 | | |
| $L_4$ | $r_8$ | 36.87 | $d_8$ 1.30 | $Nd_5$ 1.6935 | $vd_5$ 53.4 |
| | $r_9$ | 17.93 | $d_9$ 5.98 | | |
| | $r_{10}$ | ∞ (filter) | $d_{10}$ 1.50 | $Nd_6$ 1.5163 | $vd_6$ 64.1 |
| | $r_{11}$ | ∞ | $d_{11}$ 0.80 | | |
| | $r_{12}$ | 92.51 | $d_{12}$ 1.50 | $Nd_7$ 1.6935 | $vd_7$ 53.4 |
| $L_5$ | $r_{13}$ | 13.72 | $d_{13}$ 7.40 | $Nd_8$ 1.5927 | $vd_8$ 35.3 |
| | $r_{14}$ | −57.13 | $d_{14}$ 0.15 | | |
| $L_6$ | $r_{15}$ | 36.26 | $d_{15}$ 0.90 | $Nd_9$ 1.7725 | $vd_9$ 49.8 |
| | $r_{16}$ | 11.60 | $d_{16}$ 1.14 | | |
| $L_7$ | $r_{17}$ | 14.60 | $d_{17}$ 6.00 | $Nd_{10}$ 1.5827 | $vd_{10}$ 46.4 |
| | $r_{18}$ | 38595.14 | $d_{18}$ 2.50 | | |
| $L_8$ | $r_{19}$ | 1497.79 | $d_{19}$ 4.00 | $Nd_{11}$ 1.5927 | $vd_{11}$ 35.3 |
| | $r_{20}$ | −13.85 | $d_{20}$ 1.40 | $Nd_{12}$ 1.5891 | $vd_{12}$ 61.1 |
| | $r_{21}$ | −28.00 | $d_{21}$ 0.15 | | |
| $L_9$ | $r_{22}$ | 165.28 | $d_{22}$ 5.55 | $Nd_{13}$ 1.8052 | $vd_{13}$ 25.4 |
| | $r_{23}$ | 45.85 | $d_{23}$ 1.65 | | |
| $L_{10}$ | $r_{24}$ | −65.69 | $d_{24}$ 0.80 | $Nd_{14}$ 1.9229 | $vd_{14}$ 20.9 |
| | $r_{25}$ | 38.31 | $d_{25}$ 5.85 | $Nd_{15}$ 1.4875 | $vd_{15}$ 70.1 |
| | $r_{26}$ | −16.37 | $d_{26}$ 0.15 | | |
| $L_{11}$ | $r_{27}$ | 11987.53 | $d_{27}$ 3.50 | $Nd_{16}$ 1.7725 | $vd_{16}$ 49.8 |
| | $r_{28}$ | −31.01 | | | |

TABLE 3

(Embodiment 3)

f = 14.35, $F_{No}$ = 2.8, $2\omega$ = 114°

| | | Radius of Curvature | Axial Distance | Refractive Index | Abbe Number |
|---|---|---|---|---|---|
| $L_1$ | $r_1$ | 63.34 | $d_1$ 10.00 | $Nd_1$ 1.6031 | $vd_1$ 60.7 |
| | $r_2$ | 83.78 | | | |

TABLE 3-continued (Embodiment 3)

$f = 14.35$, $F_{No} = 2.8$, $2\omega = 114°$

| | Radius of Curvature | | Axial Distance | Refractive Index | | Abbe Number |
|---|---|---|---|---|---|---|
| | | $d_2$ | 0.15 | | | |
| $L_2$ | $r_3$ 42.29 | $d_3$ | 3.10 | $Nd_2$ 1.6975 | $\nu d_2$ | 48.3 |
| | $r_4$ 20.90 | $d_4$ | 9.70 | | | |
| $L_3$ | $r_5^*$ 38.34 | $d_5$ | 1.70 | $Nd_3$ 1.6968 | $\nu d_3$ | 55.5 |
| | $r_6$ 19.32 | $d_6$ | 6.50 | | | |
| $L_4$ | $r_7$ 33.72 | $d_7$ | 1.30 | $Nd_4$ 1.6935 | $\nu d_4$ | 48.3 |
| | $r_8$ 17.18 | $d_8$ | 5.98 | | | |
| | $r_9$ ∞ (filter) | $d_9$ | 1.80 | $Nd_5$ 1.5163 | $\nu d_5$ | 64.1 |
| | $r_{10}$ ∞ | $d_{10}$ | 0.80 | | | |
| $L_5$ | $r_{11}$ 75.66 | $d_{11}$ | 1.50 | $Nd_6$ 1.6968 | $\nu d_6$ | 55.5 |
| | $r_{12}$ 13.08 | $d_{12}$ | 7.40 | $Nd_7$ 1.6034 | $\nu d_7$ | 38.0 |
| | $r_{13}$ −85.24 | $d_{13}$ | 0.15 | | | |
| $L_6$ | $r_{14}$ 35.39 | $d_{14}$ | 0.90 | $Nd_8$ 1.7725 | $\nu d_8$ | 49.8 |
| | $r_{15}$ 11.18 | $d_{15}$ | 1.14 | | | |
| $L_7$ | $r_{16}$ 13.62 | $d_{16}$ | 6.00 | $Nd_9$ 1.5762 | $\nu d_9$ | 41.4 |
| | $r_{17}$ 869.40 | $d_{17}$ | 2.50 | | | |
| $L_8$ | $r_{18}$ 1670.09 | $d_{18}$ | 5.40 | $Nd_{10}$ 1.5112 | $\nu d_{10}$ | 51.0 |
| | $r_{19}$ −31.15 | $d_{19}$ | 0.20 | | | |
| $L_9$ | $r_{20}$ 116.28 | $d_{20}$ | 5.40 | $Nd_{11}$ 1.6990 | $\nu d_{11}$ | 31.1 |
| | $r_{21}$ −18.13 | $d_{21}$ | 2.15 | $Nd_{12}$ 1.5955 | $\nu d_{12}$ | 39.2 |
| | $r_{22}$ 55.04 | $d_{22}$ | 1.15 | | | |
| $L_{10}$ | $r_{23}$ −89.41 | $d_{23}$ | 0.80 | $Nd_{13}$ 1.9229 | $\nu d_{13}$ | 20.9 |
| | $r_{24}$ 28.23 | $d_{24}$ | 5.10 | $Nd_{14}$ 1.4875 | $\nu d_{14}$ | 70.1 |
| | $r_{25}$ −16.70 | $d_{25}$ | 0.15 | | | |
| | $r_{26}$ 563.73 | | | | | |
| $L_{11}$ | $r_{27}$ −39.93 | $d_{26}$ | 2.75 | $Nd_{15}$ 1.7725 | $\nu d_{15}$ | 49.8 |

TABLE 4

(Embodiment 4)

$f = 14.35$, $F_{No} = 2.8$, $2\omega = 114°$

| | Radius of Curvature | | Axial Distance | Refractive Index | | Abbe Number |
|---|---|---|---|---|---|---|
| $L_1$ | $r_1$ 57.50 | $d_1$ | 10.00 | $Nd_1$ 1.6031 | $\nu d_1$ | 60.7 |
| | $r_2$ 72.50 | $d_2$ | 0.15 | | | |
| $L_2$ | $r_3$ 38.00 | $d_3$ | 3.10 | $Nd_2$ 1.6935 | $\nu d_2$ | 53.4 |
| | $r_4$ 20.00 | $d_4$ | 9.70 | | | |
| $L_3$ | $r_5$ 34.50 | $d_5$ | 1.70 | $Nd_3$ 1.6968 | $\nu d_3$ | 55.5 |
| | $r_6$ 19.00 | $d_6$ | 6.50 | | | |
| $L_4$ | $r_7^*$ 32.19 | $d_7$ | 1.30 | $Nd_4$ 1.6935 | $\nu d_4$ | 53.4 |
| | $r_8$ 16.26 | $d_8$ | 5.98 | | | |
| | $r_9$ ∞ (filter) | $d_9$ | 1.80 | $Nd_5$ 1.5163 | $\nu d_5$ | 64.1 |
| | $r_{10}$ ∞ | $d_{10}$ | 0.80 | | | |
| $L_5$ | $r_{11}$ 60.88 | $d_{11}$ | 1.50 | $Nd_6$ 1.6968 | $\nu d_6$ | 55.5 |
| | $r_{12}$ 12.90 | $d_{12}$ | 7.40 | $Nd_7$ 1.6034 | $\nu d_7$ | 38.0 |
| | $r_{13}$ −78.06 | $d_{13}$ | 0.15 | | | |
| $L_6$ | $r_{14}$ 31.21 | $d_{14}$ | 0.90 | $Nd_8$ 1.7725 | $\nu d_8$ | 49.8 |
| | $r_{15}$ 10.83 | $d_{15}$ | 1.14 | | | |
| $L_7$ | $r_{16}$ 13.24 | $d_{16}$ | 6.00 | $Nd_9$ 1.5112 | $\nu d_9$ | 51.0 |
| | $r_{17}$ −1390.49 | $d_{17}$ | 2.50 | | | |
| $L_8$ | $r_{18}$ 1291.56 | $d_{18}$ | 5.40 | $Nd_{10}$ 1.5112 | $\nu d_{10}$ | 51.0 |
| | $r_{19}$ −34.41 | $d_{19}$ | 0.20 | | | |
| $L_9$ | $r_{20}$ 120.03 | $d_{20}$ | 5.40 | $Nd_{11}$ 1.6990 | $\nu d_{11}$ | 31.1 |
| | $r_{21}$ −18.03 | $d_{21}$ | 2.15 | $Nd_{12}$ 1.5955 | $\nu d_{12}$ | 39.2 |
| | $r_{22}$ 51.01 | $d_{22}$ | 1.15 | | | |
| $L_{10}$ | $r_{23}$ −79.66 | $d_{23}$ | 0.80 | $Nd_{13}$ 1.9229 | $\nu d_{13}$ | 20.9 |
| | $r_{24}$ 29.65 | $d_{24}$ | 5.10 | $Nd_{14}$ 1.4875 | $\nu d_{14}$ | 70.1 |
| | $r_{25}$ −16.11 | $d_{25}$ | 0.15 | | | |
| $L_{11}$ | $r_{26}$ −756.14 | $d_{26}$ | 2.75 | $Nd_{15}$ 1.7725 | $\nu d_{15}$ | 49.8 |
| | $r_{27}$ −32.78 | | | | | |

TABLE 5

| | Emb. 1 | Emb. 2 | Emb. 3 | Emb. 4 |
|---|---|---|---|---|
| $C_0$ | $1/r_1$ | $1/r_3$ | $1/r_5$ | $1/r_7$ |
| $C_1$ | 0.0 | 0.0 | 0.0 | 0.0 |
| $C_2$ | $0.74564 \times 10^{-6}$ | $0.39760 \times 10^{-5}$ | $0.11426 \times 10^{-4}$ | $0.24796 \times 10^{-4}$ |
| $C_3$ | $0.11836 \times 10^{-1}$ | $0.12630 \times 10^{-8}$ | $0.39960 \times 10^{-8}$ | $0.12192 \times 10^{-8}$ |
| $C_4$ | $-0.84905 \times 10^{-12}$ | $-0.27537 \times 10^{-11}$ | $-0.12456 \times 10^{-10}$ | $0.15449 \times 10^{-9}$ |
| $C_5$ | $0.29939 \times 10^{-15}$ | $0.24877 \times 10^{-14}$ | $0.96532 \times 10^{-13}$ | $0.11745 \times 10^{-12}$ |

Figure 1:
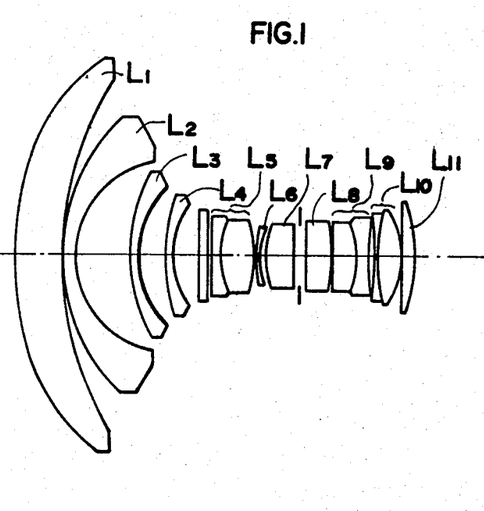
FIG. 1 represents a schematic cross sectional view of a first embodiment of the present invention.

In each of the embodiments, focusing can be accomplished by shifting the entire lens system with the air space that includes the aperture stop reduced in accordance with the degree of shift of the lens system toward the object side, if necessary, for correcting aberrations with respect to a close focusing condition. In case of the first embodiment, however, focusing is possible by shifting only lenses $L_8$ to $L_{11}$ toward the object side with the lenses $L_1$ to $L_7$ remaining stationary. In this case, the air space $d_{17}$ (which is 2.50 when focused in infinity as shown in Table 1) is reduced to 1.68 when magnification, $\beta = 0.05$, and to 1.27 when magnification, $\beta = 0.07$ in accordance with the forward shift of the lenses $L_8$ to $L_{11}$.

Figure 3:
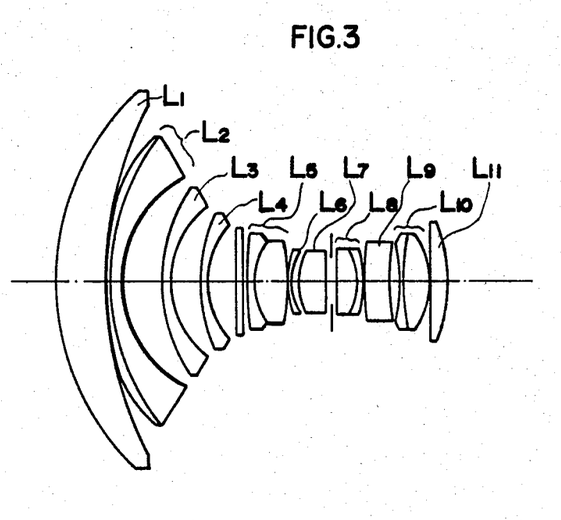
FIG. 3 represents a schematic cross sectional view of a second embodiment of the present invention.

In the second embodiment disclosed in FIG. 3 and Table 2, a plastic lens element is used to form the aspheric surface. As shown in FIG. 3, the lens $L_2$ is a doublet, and the object side lens element is made of methylmethacrylate, the aspheric surface being formed on this plastic lens element as the object side surface thereof.

Figure 2A:
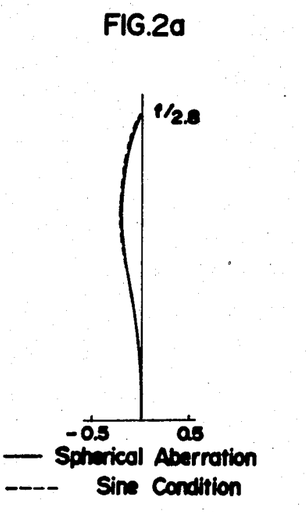
FIGS. 2a, 2b and 2c represent graphic plots of the aberrations of the first embodiment.
Figure 2B:
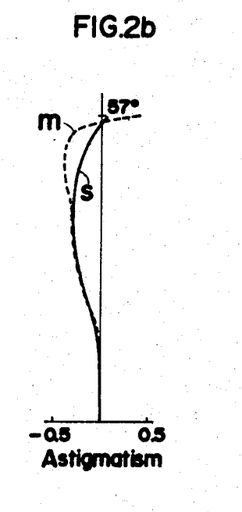
Figure 2C:
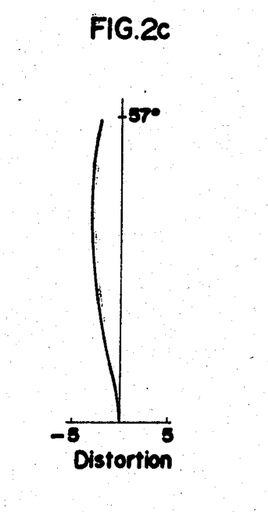
Figure 4A:
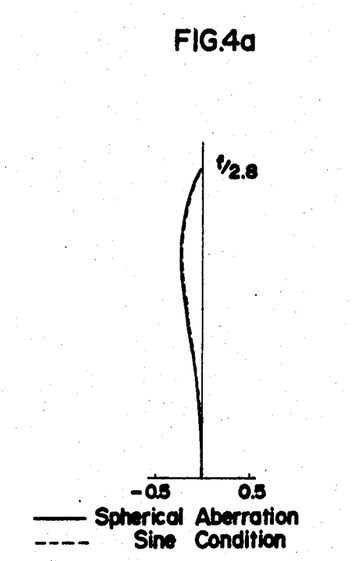
FIGS. 4a, 4b and 4c represent graphic plots of the aberrations of the second embodiment.
Figure 4B:
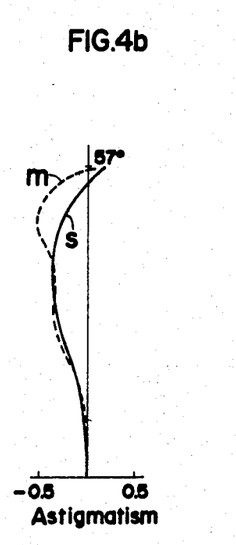
Figure 4C:
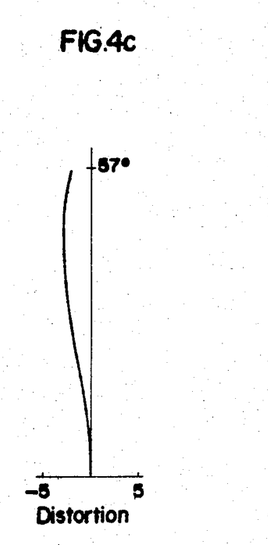
Figure 5:
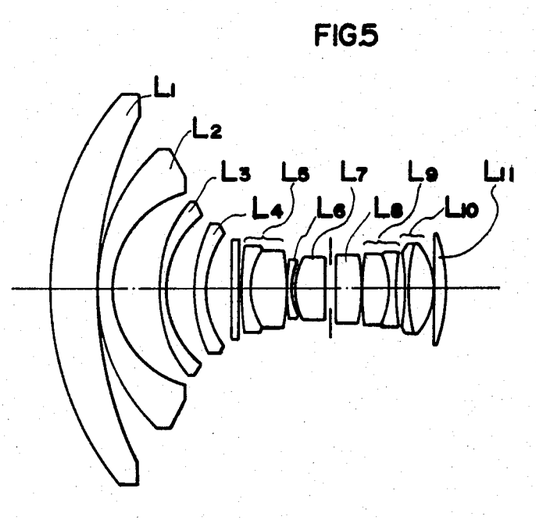
FIG. 5 represents a schematic cross sectional view of a third embodiment of the present invention.
Figure 6A:
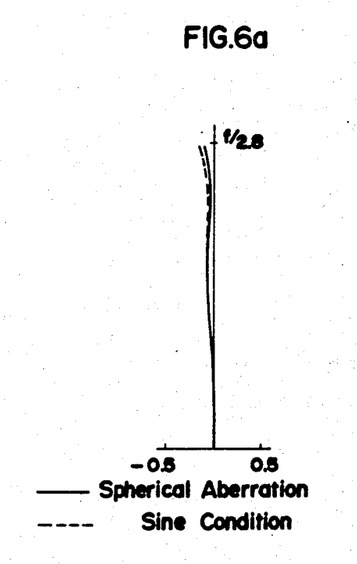
FIGS. 6a, 6b and 6c represent graphic plots of the aberrations of the third embodiment.
Figure 6B:
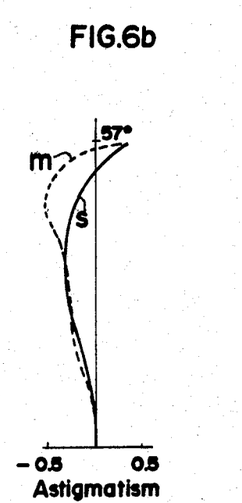
Figure 6C:
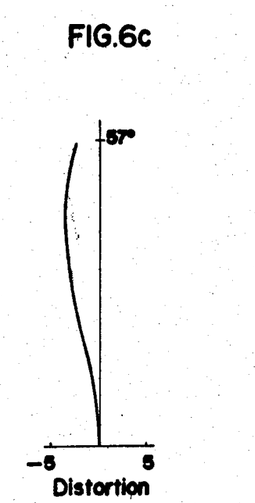
Figure 7:
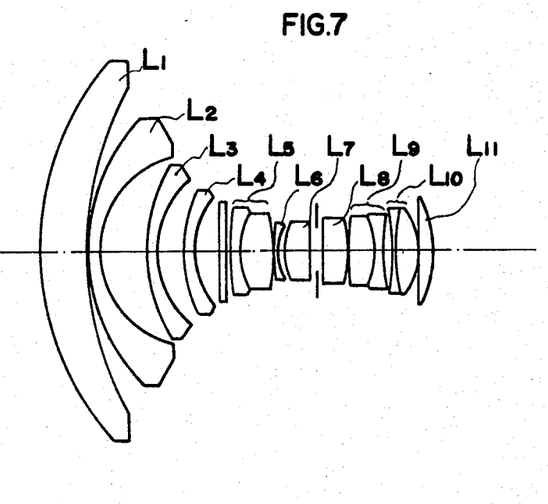
FIG. 7 represents a schematic cross sectional view of a fourth embodiment of the present invention.
Figure 8A:
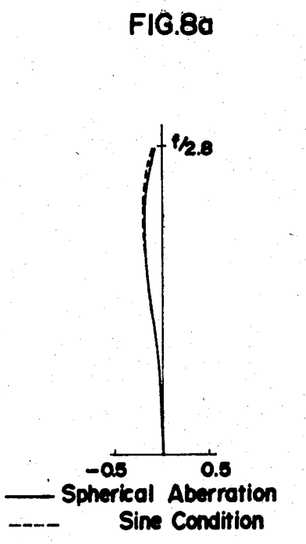
FIGS. 8a, 8b and 8c represent graphic plots of the aberrations of the fourth embodiment.
Figure 8B:
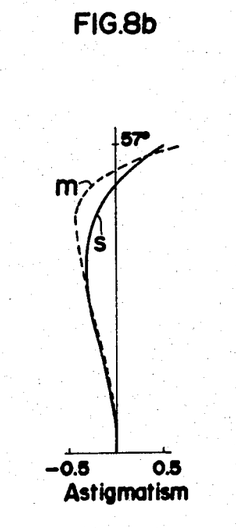
Figure 8C:
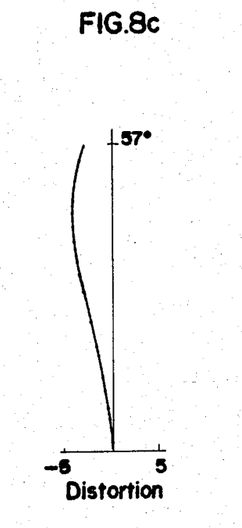

Graphic plots of spherical aberration, astigmatism and distortion are disclosed, respectively, in FIGS. 2a, 2b, and 2c for the first embodiment; FIGS. 4a, 4b and 4c for the second embodiment; FIGS. 6a, 6b and 6c for the third embodiment; and FIGS. 8a, 8b and 8c for the fourth embodiment of the present invention.

While the above embodiments have been disclosed as the best modes presently contemplated by the inventor, it should be realized that these examples should not be interpreted as limiting, because artisans skilled in this field, once given the present teachings, can vary from these specific embodiments.

Accordingly, the scope of the present invention should be determined solely from the following claims, in which I claim:

1. An inverted telephoto type wide angle lens system comprising from the object to the image side:
    a front lens group of an overall negative refractive power having a first positive meniscus lens convex to the object side and second to fourth negative meniscus lenses each convex to the object side, at least one of the refractive surfaces in the front lens group being aspheric; and
    a rear lens group of an overall positive refractive power having a pair of positive lenses sandwiching a negative meniscus lens convex to the object side, an aperture stop, and fourth to seventh lenses,
    wherein the lens system fulfills the following conditions:

$1.0f < |f_F| < 1.4f$ $4.5f < R_1 < 6.4f$ $1.2f < R_2 < 1.7f$ $1.2f < R_3 < 1.5f$ wherein:
    f represents the focal length of the whole lens system;
    $f_F$ represents the focal length of the front lens group;
    $R_1$ represents the radius of curvature of the image side surface of the first positive meniscus lens in the front lens group;
    $R_2$ represents the radius of curvature of the image side surface of the second negative meniscus lens in the front lens group; and
    $R_3$ represents the radius of curvature of the image side surface of the third negative meniscus lens in the front lens group.

2. The invention of claim 1 wherein the object side surface of one of the lenses in the front lens group is aspheric.

3. The invention of claim 2, wherein the object side surface of the first positive meniscus lens is aspheric.

4. The invention of claim 2, wherein the object side surface of the second negative meniscus lens is aspheric.

5. The invention of claim 2, wherein the object side surface of the third negative meniscus lens is aspheric.

6. The invention of claim 2, wherein the object side surface of the fourth negative meniscus lens is aspheric.

7. The invention of claim 1, wherein the aspheric surface is formed on a doublet composed of a glass lens element having spherical surfaces and a plastic lens element having an aspheric surface cemented on the glass lens element at the object side thereof.

8. An inverted telephoto type wide angle lens system comprising from the object to the image side:
    a front lens group of an overall negative refractive power having at least a first to third meniscus lenses from the front of the lens system; and
    a rear lens group of an overall positive refractive power,
    wherein the lens system fulfills the following conditions:

$1.0f < |f_F| < 1.4f$ $4.5f < R_1 < 6.4f$ $1.2f < R_2 < 1.7f$ $1.2f < R_3 < 1.5f$ wherein:
    f represents the focal length of the whole lens system;
    $f_F$ represents the focal length of the front lens group;
    $R_1$ represents the radius of curvature of the image side surface of the first meniscus lens in the front lens group;
    $R_2$ represents the radius of curvature of the image side surface of the second meniscus lens in the front lens group; and
    $R_3$ represents the radius of curvature of the image side surface of the third meniscus lens in the front lens group.

9. The invention of claim 8, wherein at least one of the refractive surfaces in the front lens group is aspheric.

10. The invention of claim 9, wherein the front lens group includes a plastic lens element, the aspheric surface being formed on the plastic lens element.

11. An inverted telephoto type wide angle lens system comprising the following design parameters:

| | | f = 14.35 | | $F_{No}$ = 2.8 | | $2\omega$ = 114° | |
|---|---|---|---|---|---|---|---|
| | | Radius of Curvature | | Axial Distance | Refractive Index | | Abbe Number |
| $L_1$ | $r_1$* | 69.55 | $d_1$ | 10.00 | $Nd_1$ 1.6031 | $\nu d_1$ | 60.7 |
| | $r_2$ | 72.50 | $d_2$ | 0.15 | | | |
| $L_2$ | $r_3$ | 37.93 | $d_3$ | 3.10 | $Nd_2$ 1.6968 | $\nu d_2$ | 55.5 |
| | $r_4$ | 19.76 | $d_4$ | 11.61 | | | |
| $L_3$ | $r_5$ | 34.65 | $d_5$ | 1.70 | $Nd_3$ 1.6968 | $\nu d_3$ | 55.5 |
| | $r_6$ | 18.98 | $d_6$ | 5.63 | | | |
| $L_4$ | $r_7$ | 36.67 | $d_7$ | 1.30 | $Nd_4$ 1.7725 | $\nu d_4$ | 49.8 |
| | $r_8$ | 18.39 | $d_8$ | 5.98 | | | |
| | $r_9$ | ∞ (filter) | $d_9$ | 1.80 | $Nd_5$ 1.5163 | $\nu d_5$ | 64.1 |
| | $r_{10}$ | ∞ | $d_{10}$ | 0.80 | | | |
| $L_5$ | $r_{11}$ | −605.88 | $d_{11}$ | 1.50 | $Nd_6$ 1.6968 | $\nu d_6$ | 55.5 |
| | $r_{12}$ | 14.82 | $d_{12}$ | 7.42 | $Nd_7$ 1.6034 | $\nu d_7$ | 38.0 |
| | $r_{13}$ | −42.70 | $d_{13}$ | 0.50 | | | |

-continued

| | f = 14.35 Radius of Curvature | | $F_{No} = 2.8$ Axial Distance | | Refractive Index | $2\omega = 114°$ Abbe Number |
|---|---|---|---|---|---|---|
| $L_6$ | $r_{14}$ | 25.40 | $d_{14}$ | 0.90 | $Nd_8$ 1.7725 | $\nu d_8$ 49.8 |
| | $r_{15}$ | 13.65 | $d_{15}$ | 1.14 | | |
| $L_7$ | $r_{16}$ | 16.78 | $d_{16}$ | 6.00 | $Nd_9$ 1.5112 | $\nu d_9$ 51.0 |
| | $r_{17}$ | −2302.13 | $d_{17}$ | 2.50 | | |
| $L_8$ | $r_{18}$ | 1037.13 | $d_{18}$ | 5.40 | $Nd_{10}$ 1.5112 | $\nu d_{10}$ 51.0 |
| | $r_{19}$ | −44.79 | $d_{19}$ | 0.20 | | |
| $L_9$ | $r_{20}$ | 140.52 | $d_{20}$ | 5.40 | $Nd_{11}$ 1.6990 | $\nu d_{11}$ 31.1 |
| | $r_{21}$ | −18.65 | $d_{21}$ | 2.15 | $Nd_{12}$ 1.5955 | $\nu d_{12}$ 39.2 |
| | $r_{22}$ | 51.92 | $d_{22}$ | 1.00 | | |
| $L_{10}$ | $r_{23}$ | −168.60 | $d_{23}$ | 0.80 | $Nd_{13}$ 1.9229 | $\nu d_{13}$ 20.9 |
| | $r_{24}$ | 28.89 | $d_{24}$ | 5.10 | $Nd_{14}$ 1.4875 | $\nu d_{14}$ 70.1 |
| | $r_{25}$ | −18.84 | $d_{25}$ | 0.15 | | |
| $L_{11}$ | $r_{26}$ | −528.51 | $d_{26}$ | 2.75 | $Nd_{15}$ 1.7725 | $\nu d_{15}$ 49.8 |
| | $r_{27}$ | −35.09 | | | | | wherein
* indicates an aspheric surface as follows:

$$X = \frac{C_0 Y^2}{1 + (1 - C_0^2 Y^2)^{\frac{1}{2}}} + \sum_{i=1} C_i Y^{2i}$$

X represents the coordinate along the optical axis measured from the top of the basis spherical surface; Y represents the coordinate perpendicular to the optical axis measured from the optical axis (height from the optical axis); Co represents the curvature of the basis spherical surface; and Ci represents the aspheric surface coefficient,
$C_0 = 1/r_1$
$C_1 = 0.0$
$C_2 = 0.74564 \times 10^{-6}$
$C_3 = 0.11836 \times 10^{-8}$
$C_4 = -0.84905 \times 10^{-12}$
$C_5 = 0.29939 \times 10^{-15}$.

12. An inverted telephoto type wide angle lens system comprising the following design parameters:

| | f = 14.35 Radius of Curvature | | $F_{No} = 2.8$ Axial Distance | | Refractive Index | $2\omega = 114°$ Abbe Number |
|---|---|---|---|---|---|---|
| $L_1$ | $r_1$ | 54.44 | $d_1$ | 10.00 | $Nd_1$ 1.6031 | $\nu d_1$ 66.7 |
| | $r_2$ | 74.70 | $d_2$ | 0.15 | | |
| $L_2$ | $r_3*$ | 69.06 | $d_3$ | 1.00 | $Nd_2$ 1.4901 | $\nu d_2$ 57.9 |
| | $r_4$ | 46.51 | $d_4$ | 2.10 | $Nd_3$ 1.6935 | $\nu d_3$ 53.4 |
| | $r_5$ | 23.65 | $d_5$ | 9.70 | | |
| $L_3$ | $r_6$ | 35.73 | $d_6$ | 1.70 | $Nd_4$ 1.6975 | $\nu d_4$ 48.3 |
| | $r_7$ | 20.19 | $d_7$ | 6.50 | | |
| $L_4$ | $r_8$ | 36.87 | $d_8$ | 1.30 | $Nd_5$ 1.6935 | $\nu d_5$ 53.4 |
| | $r_9$ | 17.93 | $d_9$ | 5.98 | | |

-continued

| | f = 14.35 Radius of Curvature | | $F_{No} = 2.8$ Axial Distance | | Refractive Index | $2\omega = 114°$ Abbe Number |
|---|---|---|---|---|---|---|
| | $r_{10}$ | ∞ (filter) | $d_{10}$ | 1.50 | $Nd_6$ 1.5163 | $\nu d_6$ 64.1 |
| | $r_{11}$ | ∞ | $d_{11}$ | 0.80 | | |
| $L_5$ | $r_{12}$ | 92.51 | $d_{12}$ | 1.50 | $Nd_7$ 1.6935 | $\nu d_7$ 53.4 |
| | $r_{13}$ | 13.72 | $d_{13}$ | 7.40 | $Nd_8$ 1.5927 | $\nu d_8$ 35.3 |
| | $r_{14}$ | −57.13 | $d_{14}$ | 0.15 | | |
| $L_6$ | $r_{15}$ | 36.26 | $d_{15}$ | 0.90 | $Nd_9$ 1.7725 | $\nu d_9$ 49.8 |
| | $r_{16}$ | 11.60 | $d_{16}$ | 1.14 | | |
| $L_7$ | $r_{17}$ | 14.60 | $d_{17}$ | 6.00 | $Nd_{10}$ 1.5827 | $\nu d_{10}$ 46.4 |
| | $r_{18}$ | 38595.14 | $d_{18}$ | 2.50 | | |
| $L_8$ | $r_{19}$ | 1497.79 | $d_{19}$ | 4.00 | $Nd_{11}$ 1.5927 | $\nu d_{11}$ 35.3 |
| | $r_{20}$ | −13.85 | $d_{20}$ | 1.40 | $Nd_{12}$ 1.5891 | $\nu d_{12}$ 61.1 |
| | $r_{21}$ | −28.00 | $d_{21}$ | 0.15 | | |
| $L_9$ | $r_{22}$ | 165.28 | $d_{22}$ | 5.55 | $Nd_{13}$ 1.8052 | $\nu d_{13}$ 25.4 |
| | $r_{23}$ | 45.85 | $d_{23}$ | 1.65 | | |
| $L_{10}$ | $r_{24}$ | −65.69 | $d_{24}$ | 0.80 | $Nd_{14}$ 1.9229 | $\nu d_{14}$ 20.9 |
| | $r_{25}$ | 38.31 | $d_{25}$ | 5.85 | $Nd_{15}$ 1.4875 | $\nu d_{15}$ 70.1 |
| | $r_{26}$ | −16.37 | $d_{26}$ | 0.15 | | |
| $L_{11}$ | $r_{27}$ | 11987.53 | $d_{27}$ | 3.50 | $Nd_{16}$ 1.7725 | $\nu d_{16}$ 49.8 |
| | $r_{28}$ | −31.01 | | | | | wherein
* indicates an aspheric surface as follows:

$$X = \frac{C_0 Y^2}{1 + (1 - C_0^2 Y^2)^{\frac{1}{2}}} + \sum_{i=1} C_i Y^{2i}$$

X represents the coordinate along the optical axis measured from the top of the basis spherical surface; Y represents the coordinate perpendicular to the optical axis measured from the optical axis (height from the optical axis); Co represents the curvature of the basis spherical surface; and Ci represents the aspheric surface coefficient,
$C_0 = 1/r_3$
$C_1 = 0.0$
$C_2 = 0.39760 \times 10^{-5}$
$C_3 = 0.12630 \times 10^{-8}$
$C_4 = -0.27537 \times 10^{-11}$
$C_5 = 0.24877 \times 10^{-14}$.

13. An inverted telephoto type wide angle lens system comprising the following design parameters:

| | f = 14.35 Radius of Curvature | | $F_{No} = 2.8$ Axial Distance | | Refractive Index | $2\omega = 114°$ Abbe Number |
|---|---|---|---|---|---|---|
| $L_1$ | $r_1$ | 63.34 | $d_1$ | 10.00 | $Nd_1$ 1.6031 | $\nu d_1$ 60.7 |
| | $r_2$ | 83.78 | $d_2$ | 0.15 | | |
| $L_2$ | $r_3$ | 42.29 | $d_3$ | 3.10 | $Nd_2$ 1.6975 | $\nu d_2$ 48.3 |
| | $r_4$ | 20.90 | $d_4$ | 9.70 | | |

-continued-

| | $f = 14.35$ Radius of Curvature | | $F_{No} = 2.8$ Axial Distance | | $2\omega = 114°$ Refractive Index | | Abbe Number |
|---|---|---|---|---|---|---|---|
| $L_3$ | $r_5^*$ | 38.34 | $d_5$ | 1.70 | $Nd_3$ | 1.6968 $vd_3$ | 55.5 |
| | $r_6$ | 19.32 | $d_6$ | 6.50 | | | |
| $L_4$ | $r_7$ | 33.72 | $d_7$ | 1.30 | $Nd_4$ | 1.6935 $vd_4$ | 48.3 |
| | $r_8$ | 17.18 | $d_8$ | 5.98 | | | |
| | $r_9$ | ∞ (filter) | $d_9$ | 1.80 | $Nd_5$ | 1.5163 $vd_5$ | 64.1 |
| | $r_{10}$ | ∞ | $d_{10}$ | 0.80 | | | |
| $L_5$ | $r_{11}$ | 75.66 | $d_{11}$ | 1.50 | $Nd_6$ | 1.6968 $vd_6$ | 55.5 |
| | $r_{12}$ | 13.08 | $d_{12}$ | 7.40 | $Nd_7$ | 1.6034 $vd_7$ | 38.0 |
| | $r_{13}$ | −85.24 | $d_{13}$ | 0.15 | | | |
| $L_6$ | $r_{14}$ | 35.39 | $d_{14}$ | 0.90 | $Nd_8$ | 1.7725 $vd_8$ | 49.8 |
| | $r_{15}$ | 11.18 | $d_{15}$ | 1.14 | | | |
| $L_7$ | $r_{16}$ | 13.62 | $d_{16}$ | 6.00 | $Nd_9$ | 1.5762 $vd_9$ | 41.4 |
| | $r_{17}$ | 869.40 | $d_{17}$ | 2.50 | | | |
| $L_8$ | $r_{18}$ | 1670.09 | $d_{18}$ | 5.40 | $Nd_{10}$ | 1.5112 $vd_{10}$ | 51.0 |
| | $r_{19}$ | −31.15 | $d_{19}$ | 0.20 | | | |
| $L_9$ | $r_{20}$ | 116.28 | $d_{20}$ | 5.40 | $Nd_{11}$ | 1.6990 $vd_{11}$ | 31.1 |
| | $r_{21}$ | −18.13 | $d_{21}$ | 2.15 | $Nd_{12}$ | 1.5955 $vd_{12}$ | 39.2 |
| | $r_{22}$ | 55.04 | $d_{22}$ | 1.15 | | | |
| $L_{10}$ | $r_{23}$ | −89.41 | $d_{23}$ | 0.80 | $Nd_{13}$ | 1.9229 $vd_{13}$ | 20.9 |
| | $r_{24}$ | 28.23 | $d_{24}$ | 5.10 | $Nd_{14}$ | 1.4875 $vd_{14}$ | 70.1 |
| | $r_{25}$ | −16.70 | $d_{25}$ | 0.15 | | | |
| $L_{11}$ | $r_{26}$ | 563.73 | $d_{26}$ | 2.75 | $Nd_{15}$ | 1.7725 $vd_{15}$ | 49.8 |
| | $r_{27}$ | −39.93 | | | | | | wherein
* indicates an aspheric surface as follows:

$$X = \frac{C_0 Y^2}{1 + (1 - C_0^2 Y^2)^{\frac{1}{2}}} + \sum_{i=1} C_i Y^{2i}$$

X represents the coordinate along the optical axis measured from the top of the basis spherical surface; Y represents the coordinate perpendicular to the optical axis measured from the optical axis (height from the optical axis); Co represents the curvature of the basis spherical surface; and Ci represents the aspheric surface coefficient, $C_0 = 1/r_5$
$C_1 = 0.0$
$C_2 = 0.11426 \times 10^{-4}$
$C_3 = 0.39960 \times 10^{-8}$
$C_4 = -0.12456 \times 10^{-10}$
$C_5 = 0.96532 \times 10^{-13}$.

14. An inverted telephoto type wide angle lens system comprising the following design parameters:

| | $f = 14.35$ Radius of Curvature | | $F_{No} = 2.8$ Axial Distance | | $2\omega = 114°$ Refractive Index | | Abbe Number |
|---|---|---|---|---|---|---|---|
| $L_1$ | $r_1$ | 57.50 | $d_1$ | 10.00 | $Nd_1$ | 1.6031 $vd_1$ | 60.7 |
| | $r_2$ | 72.50 | $d_2$ | 0.15 | | | |
| $L_2$ | $r_3$ | 38.00 | $d_3$ | 3.10 | $Nd_2$ | 1.6935 $vd_2$ | 53.4 |
| | $r_4$ | 20.00 | $d_4$ | 9.70 | | | |
| $L_3$ | $r_5$ | 34.50 | $d_5$ | 1.70 | $Nd_3$ | 1.6968 $vd_3$ | 55.5 |
| | $r_6$ | 19.00 | $d_6$ | 6.50 | | | |
| $L_4$ | $r_7^*$ | 32.19 | $d_7$ | 1.30 | $Nd_4$ | 1.6935 $vd_4$ | 53.4 |
| | $r_8$ | 16.26 | $d_8$ | 5.98 | | | |
| | $r_9$ | ∞ (filter) | $d_9$ | 1.80 | $Nd_5$ | 1.5163 $vd_5$ | 64.1 |
| | $r_{10}$ | ∞ | $d_{10}$ | 0.80 | | | |
| $L_5$ | $r_{11}$ | 60.88 | $d_{11}$ | 1.50 | $Nd_6$ | 1.6968 $vd_6$ | 55.5 |
| | $r_{12}$ | 12.90 | $d_{12}$ | 7.40 | $Nd_7$ | 1.6034 $vd_7$ | 38.0 |
| | $r_{13}$ | −78.06 | $d_{13}$ | 0.15 | | | |
| $L_6$ | $r_{14}$ | 31.21 | $d_{14}$ | 0.90 | $Nd_8$ | 1.7725 $vd_8$ | 49.8 |
| | $r_{15}$ | 10.83 | $d_{15}$ | 1.14 | | | |
| $L_7$ | $r_{16}$ | 13.24 | $d_{16}$ | 6.00 | $Nd_9$ | 1.5112 $vd_9$ | 51.0 |
| | $r_{17}$ | −1390.49 | $d_{17}$ | 2.50 | | | |
| $L_8$ | $r_{18}$ | 1291.56 | $d_{18}$ | 5.40 | $Nd_{10}$ | 1.5112 $vd_{10}$ | 51.0 |
| | $r_{19}$ | −34.41 | $d_{19}$ | 0.20 | | | |
| $L_9$ | $r_{20}$ | 120.03 | $d_{20}$ | 5.40 | $Nd_{11}$ | 1.6990 $vd_{11}$ | 31.1 |
| | $r_{21}$ | −18.03 | $d_{21}$ | 2.15 | $Nd_{12}$ | 1.5955 $vd_{12}$ | 39.2 |
| | $r_{22}$ | 51.01 | $d_{22}$ | 1.15 | | | |
| $L_{10}$ | $r_{23}$ | −79.66 | $d_{23}$ | 0.80 | $Nd_{13}$ | 1.9229 $vd_{13}$ | 20.9 |
| | $r_{24}$ | 29.65 | $d_{24}$ | 5.10 | $Nd_{14}$ | 1.4875 $vd_{14}$ | 70.1 |
| | $r_{25}$ | −16.11 | $d_{25}$ | 0.15 | | | |
| $L_{11}$ | $r_{26}$ | −756.14 | $d_{26}$ | 2.75 | $Nd_{15}$ | 1.7725 $vd_{15}$ | 49.8 |
| | $r_{27}$ | −32.78 | | | | | | wherein
* indicates an aspheric surface as follows:

$$X = \frac{C_0 Y^2}{1 + (1 - C_0^2 Y^2)^{\frac{1}{2}}} + \sum_{i=1} C_i Y^{2i}$$

X represents the coordinate along the optical axis measured from the top of the basis spherical surface; Y represents the coordinate perpendicular to the optical axis measured from the optical axis (height from the optical axis); Co represents the curvature of the basis spherical surface; and Ci represents the aspheric surface coefficient, $C_0 = 1/r_7$
$C_1 = 0.0$
$C_2 = 0.24796 \times 10^{-4}$
$C_3 = 0.12192 \times 10^{-8}$
$C_4 = 0.15449 \times 10^{-9}$
$C_5 = 0.11745 \times 10^{-12}$.

15. An inverted telephoto type wide angle lens system comprising from the object to the image side:
  a front lens group of an overall negative refractive power having a first positive meniscus lens convex to the object side, and at least second and third negative meniscus lenses, at least one of the refractive surfaces in the front group being aspheric; and
  a rear lens group of an overall positive refractive power, the lens system fulfilling the following conditions:

$1.0f < |f_F| < 1.4f$ $4.5f < R_1 < 6.4f$ $1.2f < R_2 < 1.7f$ $1.2f < R_3 < 1.5f$ wherein:
f represents the focal length of the whole lens system;
$f_F$ represents the focal length of the front lens group;
$R_1$ represents the radius of curvature of the image side surface of the first positive meniscus lens in the front lens group;
$R_2$ represents the radius of curvature of the image side surface of the second negative meniscus lens in the front lens group; and
$R_3$ represents the radius of curvature of the image side surface of the third negative meniscus lens in the front lens group.

* * * * *

UNITED STATES PATENT AND TRADEMARK OFFICE
CERTIFICATE OF CORRECTION

PATENT NO. : 4,431,273
DATED : February 14, 1984
INVENTOR(S) : Akiyoshi Nakamura It is certified that error appears in the above—identified patent and that said Letters Patent is hereby corrected as shown below:

In the Abstract, delete "$4.5\ f < R_1\ 6.4\ f$" and insert --$4.5\ f < R_1 < 6.4\ f$--.

In column 3, line 55, after "or" insert --first--.

In column 11, claim 12, delete first Abbe number "66.7" and insert --60.7--.

Signed and Sealed this

Fourteenth Day of May 1985

[SEAL]

Attest:

DONALD J. QUIGG

Attesting Officer     Acting Commissioner of Patents and Trademarks